Dec. 14, 1937.  R. H. PREWITT  2,102,027
AIRCRAFT ROTOR BLADE MOUNTING MECHANISM
Filed Jan. 30, 1936
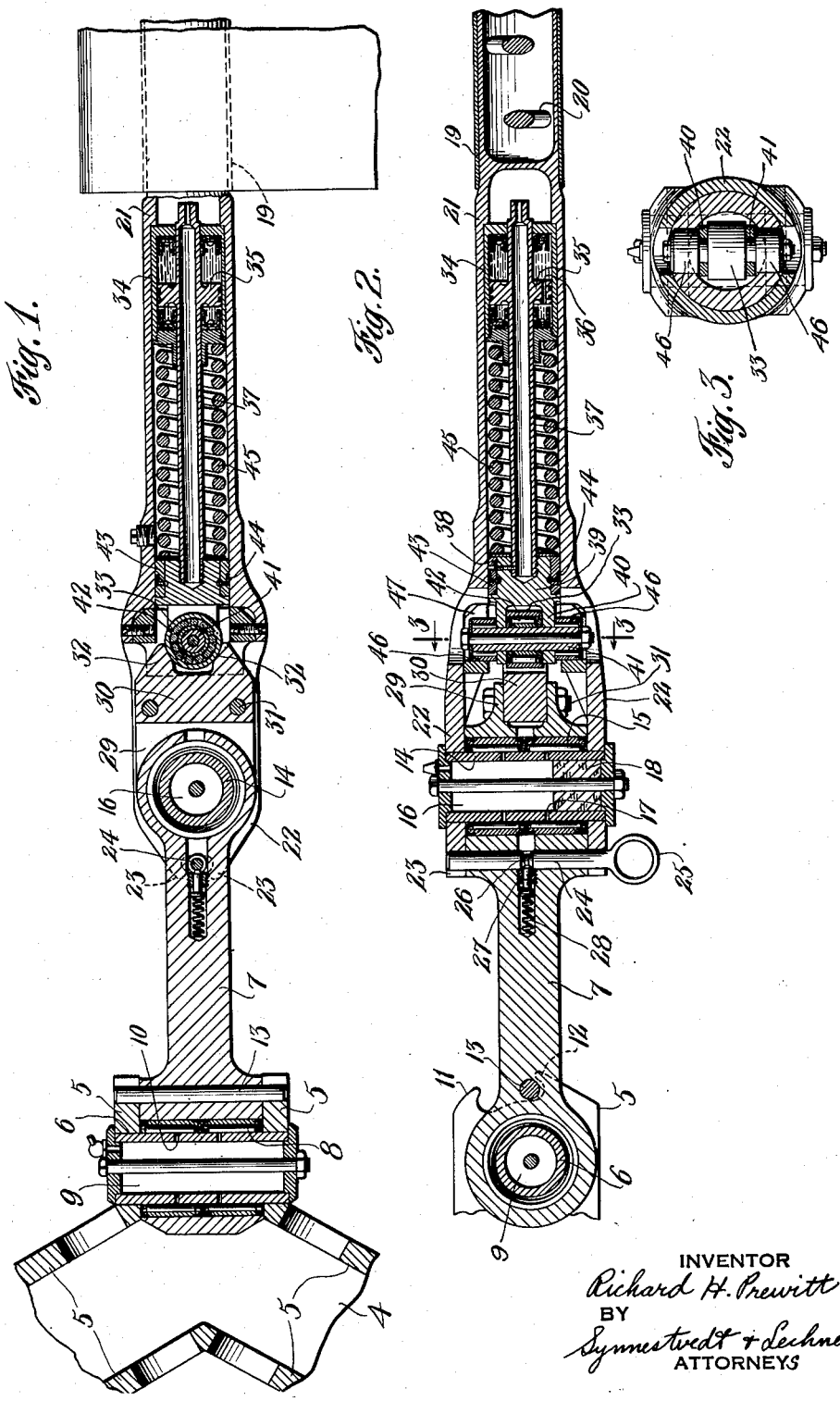
INVENTOR
Richard H. Prewitt
BY
Synnestvedt + Lechner
ATTORNEYS Patented Dec. 14, 1937

2,102,027

UNITED STATES PATENT OFFICE 2,102,027

AIRCRAFT ROTOR BLADE MOUNTING MECHANISM

Richard H. Prewitt, Lansdowne, Pa., assignor to Autogiro Company of America, Willow Grove, Pa., a corporation of Delaware Application January 30, 1936, Serial No. 61,539

23 Claims. (Cl. 244—18)

This invention relates to aircraft and is especially concerned with that type of craft equipped with a sustaining rotor incorporating a plurality of blades which are articulated to a common generally upright hub. Furthermore, the invention is especially concerned with blade mounting parts including a means for controlling movement of a blade on a pivot therefor.

Among the major objects of the invention are the provision of a device for controlling blade movements as aforesaid, which device is self-centering and which is yet substantially non-rebounding under normal flight conditions; and the provision of a means for controlling blade movements, which means is housed within a hollowed blade part such, for instance, as a fitting at the root end of the blade spar. In this way the controlling mechanism is kept within the overall confines or dimensions of the blade structure itself and its pivot joints, with the result that drag is kept at a minimum value.

The invention further has in view the provision of means providing for folding of the blades in a novel manner, this folding means being arranged to permit folding notwithstanding the conjoint use of a means for controlling or limiting movement of the blades about their pivot joints.

How the foregoing more or less general objects and advantages are attained will appear more fully as this description proceeds. In the fol'owing description, reference is made to the accompanying drawing, in which:

Figure 1 is a horizontal sectional view through the root end of the blade of an aircraft sustaining rotor and a portion of the hub to which it is attached;

Figure 2 is a view of the mechanism illustrated in Figure 1 but shown in vertical longitudinal section; and Figure 3 is a transverse sectional view of certain details, taken substantially as indicated by the section line 3—3 on Figure 2.

Referring to the drawing, the numeral 4 designates the rotor hub. In this instance the hub is shown as being constructed to mount three blades, although it will be understood that the invention may also be employed in connection with rotors embodying more or less than three blades. For the purpose of attaching the blades to the hub the latter is provided with pairs of apertured ears 5—5, each pair of which is adapted to receive a pivot 6, hereinafter termed the flapping pivot, providing for movement of the blade in a direction generally transverse its mean rotative path of travel. Between each pair of lugs 5—5 an extension link 7 is received, this link being apertured to pass the pivot pin 6 and thus complete the flapping pivot. Needle roller bearings 8 are preferably interposed between the pivot pin 6 itself and the aperture in the extension link 7. The pin 6 may also be hollowed to form a lubricant reservoir 9 from which lubricant is discharged to the bearings as by means of ducts 10. As best seen in Figure 2, each pair of apertured ears 5—5 is provided with upper and lower abutments 11 and 12 positioned to engage the transverse pin 13 upon upward or downward swinging of the blade about the flapping pivot 6. The upper stop 11, of course, prevents excessive upward movement of the blade under the influence, for example, of a gust of wind when the craft is at rest on the ground; while the lower stop 12 serves to support the blade as against excessive downward droop when the rotor is at rest.

Toward its outboard end the extension link 7 is apertured to receive an additional pivot pin 14 the axis of which is preferably extended at an angle to the axis of the flapping pivot. This pivot provides freedom for movement of the blade generally fore and aft in its rotative path of travel under the influence of acceleration or drag forces. For purposes of description this pivot may be referred to as the "drag" pivot. Needle roller bearings 15 are interposed between the aperture in the extension link 7 and the pin 14, these bearings being supplied with lubricant from the central reservoir 16 through ducts 17, similarly to the arrangement described in connection with the flapping pivot. A cork block or the like 18 may be introduced in the reservoir 16 toward its lower end so as to raise the bottom level of the reservoir to a point just below the lower ducts 17.

The blade spar, constituting the major structural element of the blade, is shown at 19. This spar is coupled, as by pins or the like 20, with a root end fitting 21 which is provided with forks 22—22 at its inboard end, these forks being apertured to pass the pivot pin 14 and thus complete the drag articulation. Each one of forks 22 is equipped with a pair of spaced stops 23—23 located inboard of the pivot 14 and adapted to cooperate with the pin 24 in limiting movement of the blade about its drag pivot within a predetermined range. The pin is provided with an eye 25 by means of which it may be drawn out from below the blade in order to render the motion limiting device inoperative and thus permit large movement of the blade about the drag articulation, for folding purposes. Pin 24 is normally retained in its operative position by means of a groove 26 positioned to receive the plunger 27 adapted to be advanced by spring 28.

At the outboard side of the drag pivot, the extension link 7 carries a pair of apertured ears 29—29 embracing a block 30, the latter being secured to the parts 29 as by bolts or rivets 31. The member or block 30 is provided with cams or the like 32—32 offset from the longitudinal axis of the blade and adapted to cooperate with the rolling bearing member 33 which constitutes the actuating element for the mechanism now to be described for controlling movement of the blade about the drag articulation.

This device incorporates a cylinder 34 and piston 35 relatively movable along the longitudinal axis of the blade, the piston and cylinder device being located internally of the hollow root end fitting 21, as clearly appears in the drawing. The cylinder 34 is adapted to contain a charge of some fluid, preferably relatively viscous, such as oil, which may pass from one side to the other of the piston 35 through one or more ports 36 during actuation of the controlling device. This passage of the fluid through the restricted port 36, of course, effects damping of the blade movement.

The piston 35 may be actuated by a stem 37 projecting toward the drag articulation and fastened as by a set screw 38 in a fitting 39 which latter has a pair of apertured ears 40 adapted to receive a pivot or pin 41. Pin 41 serves to carry the rolling bearing element 33 mentioned above by means of needle bearings or the like 42.

A sleeve 43 surrounds the outboard end of the fitting 39 and serves to guide the piston stem 37 during movement thereof within the bore provided in the blade root fitting 21. A packing 44 surrounding the collar 43 serves to retain lubricant placed within the bore.

A compression spring 45 is also positioned within the bore of the blade root fitting to react between the member 39 and one end of cylinder 34. This spring therefore constantly urges the member 39 and the pin and bearing carried thereby toward the drag pivot 14 to engage the opposed cams 32—32 formed as a part of member 30.

To further ensure free operation of the damping device, the pin 41 is provided with additional bearing elements 46 which are positioned to roll on the guides 47.

From the foregoing it will be seen that the blade movement controlling mechanism is self-centering, i. e., will constantly urge the blade to its normal radial or mid position. This, of course, is accomplished by the spring 45 urging the bearing member 33 against one or the other of the offset cams 32—32, depending upon the direction of oscillation of the rotor blades.

However, although the controlling mechanism has the self-centering function referred to above, it is at the same time substantially non-rebounding during normal flight conditions, that is, under normal flight conditions, when the blade has been angularly displaced about its pivot, the controlling device will have no substantial effect to return the blade to its normal position on the pivot or to cause the blade to "bounce" or rebound beyond said normal position as determined by the aerodynamic or flight forces acting on the blade at the time. This is desirable for a number of reasons relating to operation of the blades such as avoiding periodic or resonant oscillations, which reasons need not be considered in detail herein.

It might be here stated, however, that the fluid pressure piston and cylinder device operates to damp the spring-resisted motions of the blade about the drag hinge, so that the resilient or rebounding nature of the spring, which might set up periodic oscillations, is largely nullified. Furthermore, the force of the reaction of the spring and cam device is not so great, at least in the intermediate range of blade oscillation, as to interfere with the proper normal swinging of the blade about the drag hinge under the influence of the flight forces imposed upon the blade which are substantial.

A still further advantage of the device is involved in the shaping of the cam elements or nodes 32—32 in such manner that the roller 33 may ride over and beyond either one of the nodes when it is desired to fold the blade. Prior to this folding movement, of course, the pin 24 must be withdrawn. Similarly, the shape of the cam nodes 32—32 is arranged to permit ready return movement of the blade, i. e., movement from the folded position to the position of normal operation.

As hereinbefore mentioned, the arrangement is of considerable advantage because of the disposition of the parts of the controlling mechanism within the overall confines of the blade mounting parts and articulations. Aerodynamic drag is thus reduced to a minimum.

I claim:—

1. In mounting mechanism for attaching a rotative aircraft sustaining blade to a hub, a hollowed spar member adjacent the blade root, an articulation cooperating with an inboard portion of the hollowed member and providing for pivotal movement of the blade, a mechanism for controlling pivotal movement of the blade housed at least in large part within said hollowed member, and means lying substantially in the plane of the blade for actuating the controlling mechanism.

2. In mounting mechanism for attaching a rotative aircraft sustaining blade to a hub, a hollowed member adjacent the blade root, an articulation cooperating with an inboard portion of the hollowed member and providing for pivotal movement of the blade, and means including a damping device for controlling pivotal movement of the blade, the damping device being mounted within the hollowed member, and means lying substantially in the plane of the blade for actuating the damping device.

3. A mounting mechanism for attaching a rotative aircraft sustaining blade to a hub, including an articulation providing for pivotal movement of the blade to either side of a mid or intermediate position, means for controlling pivotal movement of the blade, said means being substantially non-rebounding under flight conditions, and automatic means positively acting to move the blade from an angled position toward said intermediate position.

4. A mounting mechanism for attaching a rotative aircraft sustaining blade to a hub, including an articulation providing for pivotal movement of the blade to either side of a mid or intermediate position, and a self-centering means controlling blade movements, said means being substantially non-rebounding under normal flight conditions.

5. A mounting for a blade of an aircraft sustaining rotor including, in combination with a hub, a pair of pivotally joined parts providing for pivotal movement of the blade, one of said parts being hollowed, means cooperating with said parts and housed at least in large part within the hollowed part, for controlling pivotal movement of the blade, and means lying substantially in the plane of the blade for actuating the controlling means.

6. A mounting for a blade of an aircraft sustaining rotor including, in combination with a hub, inboard and outboard pivotally connected mounting parts, means mounted on one of said parts for controlling pivotal movement of the blade, and an actuating member for said means carried by the other of said parts and projecting beyond the pivot joint toward the part carrying the controlling means to cooperate therewith, the actuating member lying substantially in the plane of the blade.

7. A mounting for a blade of an aircraft sustaining rotor including, in combination with a hub, inboard and outboard pivotally connected mounting parts, means mounted on one of said parts for controlling pivotal movement of the blade, and an actuating member for said means carried by the other of said parts and projecting beyond the pivot joint toward the part carrying the controlling means to cooperate therewith, the said means including a device movable substantially along the longitudinal axis of the blade, the actuating member lying substantially in the plane of the blade.

8. In combination with a blade and hub of an aircraft sustaining rotor, a mechanism for mounting the blade on the hub including an inboard mounting part and an outboard mounting part, a pivot joining said parts and providing for relative movement thereof about an axis extended at an angle to the longitudinal axis of the blade, means for controlling movement of the blade about said axis, said means being carried on the outboard part, and cooperating abutments carried on the inboard part but projecting outboard of the pivot to cooperate with the controlling means.

9. In combination with a blade and hub of an aircraft sustaining rotor, a mechanism for mounting the blade on the hub including an inboard mounting part and an outboard mounting part, a pivot joining said parts and providing for relative movement thereof about an axis extended at an angle to the longitudinal axis of the blade, the outboard part being hollowed, means within said hollowed part for controlling movement of the blade about said axis, and cooperating abutments carried on the inboard part but projecting outboard of the pivot to cooperate with the controlling means.

10. In an aircraft sustaining rotor having a hub and an autorotative wing or blade, mechanism for mounting the blade on the hub including a substantially vertical pivot, and a hydraulically-damped spring-loaded self-centering mechanism controlling the rotor blade oscillations about said vertical pivot.

11. In an aircraft sustaining rotor having a hub and an autorotative wing or blade, mechanism for mounting the blade on the hub including a substantially vertical pivot, and a hydraulically-damped spring-loaded self-centering mechanism controlling the rotor blade oscillations about said vertical pivot, said blade having a spar with a forked end cooperating with said pivot and a hollow formed in the spar and housing said self-centering mechanism.

12. In combination with a blade and hub, a pivot for mounting the blade on the hub with freedom for pivotal movement with respect thereto, and a mechanism for controlling pivotal movement of the blade including operating parts connected with blade parts at opposite sides of the pivot, and a damping device actuable by said operating parts and including a device movable in a path generally paralleling the longitudinal axis of the blade.

13. In combination with a blade and hub, a pivot for mounting the blade on the hub with freedom for pivotal movement with respect thereto, a part of the blade outboard of the pivot being hollowed, and a mechanism for controlling pivotal movement of the blade, said mechanism including a fluid pressure piston and cylinder device at least in large part mounted within said hollowed part, and an actuating element for said device connected with a part inboard of said pivot.

14. In combination with a blade and hub, a pivot for mounting the blade on the hub with freedom for pivotal movement with respect thereto, a part of the blade outboard of the pivot being hollowed, and a mechanism for controlling pivotal movement of the blade, said mechanism including a fluid pressure piston and cylinder device, the elements of which are housed within said hollowed part and mounted to move in a path generally paralleling the longitudinal axis of the blade, and an actuating element for said device connected with a part inboard of said pivot.

15. In combination with a blade and hub, a pivot for mounting the blade on the hub with freedom for pivotal movement with respect thereto, a part of the blade outboard of the pivot being hollowed, and a mechanism for controlling pivotal movement of the blade, said mechanism including a fluid pressure piston and cylinder device, the elements of which are housed within said hollowed part and mounted to move in a path generally paralleling the longitudinal axis of the blade, and an actuating element for said device connected with a part inboard of said pivot, the said device being provided with a rolling bearing adapted to cooperate with the actuating element.

16. In combination with a blade and hub, a pivot for mounting the blade on the hub with freedom for pivotal movement with respect thereto, a part of the blade outboard of the pivot being hollowed, and a mechanism for controlling pivotal movement of the blade, said mechanism including a fluid pressure piston and cylinder device, the elements of which are housed within said hollowed part and mounted to move in a path generally paralleling the longitudinal axis of the blade, and actuating means for said device having portions thereof disposed toward opposite sides of a plane containing the axis of the pivot and the longitudinal axis of the blade, the said device being provided with a rolling bearing cooperating with the actuating means upon pivotal movement of the blade toward either side of an intermediate position.

17. In combination with a blade and hub, a pivot for mounting the blade on the hub with freedom for pivotal movement with respect thereto, a part of the blade outboard of the pivot being hollowed, and a mechanism for controlling pivotal movement of the blade, said mechanism including a fluid pressure piston and cylinder device, the elements of which are housed within said hollowed part and mounted to move in a path generally paralleling the longitudinal axis of the blade, actuating means for said device having portions thereof disposed toward opposite sides of a plane containing the axis of the pivot and the longitudinal axis of the blade, the said device being provided with a rolling bearing cooperating with the actuating means upon pivotal movement of the blade toward either side of an intermediate position, and means normally urging the rolling bearing toward its mid position with reference to the actuating means.

18. In combination with a pivotally mounted aircraft sustaining rotor blade, a mechanism for controlling pivotal movement of the blade including a fluid pressure piston and cylinder device disposed at one side of the blade pivot, and means for causing relative movement of the piston and cylinder elements of said device upon pivotal movement of the blade, said means including an actuating device having parts lying toward opposite sides of the longitudinal axis of the blade, and a cooperating element between said parts and connected with one element of the fluid pressure device to effect relative axial movement thereof upon pivotal movement of the blade in either direction from an intermediate position.

19. In combination with a pivotally mounted aircraft sustaining rotor blade, a mechanism for controlling pivotal movement of the blade including a fluid pressure piston and cylinder device disposed at one side of the blade pivot, and means for causing relative movement of the piston and cylinder elements of said device upon pivotal movement of the blade, said means including an actuating device having parts lying toward opposite sides of the longitudinal axis of the blade, and a cooperating element between said parts and connected with one element of the fluid pressure device to effect relative axial movement thereof upon pivotal movement of the blade in either direction from an intermediate position, and a cooperating rolling bearing connected with one element of said device for causing movement thereof, the bearing element being mounted for movement in a direction generally paralleling the blade axis upon engagement with said parts of the actuating device when the blade swings on its pivot, and a pair of guides for the bearing element substantially paralleling the longitudinal blade axis.

20. In combination with a pivotally mounted aircraft sustaining rotor blade, a mechanism for controlling pivotal movement of the blade including a fluid pressure piston and cylinder device disposed at one side of the blade pivot, and means for causing relative movement of the piston and cylinder elements of said device upon pivotal movement of the blade, said means including an actuating device having parts lying toward opposite sides of the longitudinal axis of the blade, and a cooperating element between said parts and connected with one element of the fluid pressure device to effect relative axial movement thereof upon pivotal movement of the blade in either direction from an intermediate position, and a cooperating rolling bearing connected with one element of said device for causing movement thereof, the bearing element being mounted for movement in a direction generally paralleling the blade axis upon engagement with said parts of the actuating device when the blade swings on its pivot, and a pair of guides for the bearing element substantially paralleling the longitudinal blade axis, the bearing element also being provided with additional rolling bearing means adapted to ride on said guides.

21. In combination with an aircraft sustaining rotor blade, a pair of pivot parts for mounting the blade with freedom for pivotal movement, means restricting pivotal movement of said parts within a predetermined range including a pair of spaced stops movable with one part and an intermediate cooperating stop movable with the other part, the intermdiate stop being retractible to provide for pivotal movement of the blade beyond said range, whereby to permit folding of the blade or the like.

22. In combination with an aircraft sustaining rotor blade, a pair of pivot parts for mounting the blade with freedom for pivotal movement, means restricting pivotal movement of said parts within a predetermined range including a pair of spaced stops movable with one part, an intermediate cooperating stop and a mechanism for controlling pivotal movement of the blade within said predetermined range including a substantially self-centering non-rebounding damper device.

23. In combination with an aircraft sustaining rotor blade, a pair of pivot parts for mounting the blade with freedom for pivotal movement, means restricting pivotal movement of said parts within a predetermined range including a pair of stops movable with one part, an intermediate cooperating stop, and a mechanism for controlling pivotal movement of the blade within said predetermined range including a substantially self-centering damper device, the damper device incorporating an element movable longitudinally of the blade for damping purposes and cooperating actuating parts therefor disposed toward opposite sides of the longitudinal axis of the blade between which said element is positioned in flight operation, at least one of said cooperating parts being configured to provide for displacement thereof with reference to the damper element beyond the position of normal flight operation, as when folding the blade.

RICHARD H. PREWITT.